(12) United States Patent
Cowan

(10) Patent No.: US 12,402,742 B2
(45) Date of Patent: Sep. 2, 2025

(54) MICROWAVE WITH WATER DISPENSER

(71) Applicant: Midea Group Co., Ltd., Foshan (CN)

(72) Inventor: Richard W. Cowan, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 1018 days.

(21) Appl. No.: 17/479,069

(22) Filed: Sep. 20, 2021

(65) Prior Publication Data
US 2023/0092534 A1 Mar. 23, 2023

(51) Int. Cl.
*A47J 27/00* (2006.01)
*B65H 75/44* (2006.01)
*F16L 3/01* (2006.01)

(52) U.S. Cl.
CPC ............ *A47J 27/004* (2013.01); *B65H 75/44* (2013.01); *F16L 3/012* (2013.01)

(58) Field of Classification Search
CPC ...... A47J 31/106; A47J 31/401; A47J 31/547; A47J 36/027; A47J 37/1209; F16L 27/0808; F16L 27/082; F24C 15/00; E03C 1/0404; E03C 1/05; E03C 1/055; E03C 1/057; E03C 2001/0414; E03C 2201/40; A62C 3/006; A62C 3/16; A62C 31/02
USPC ............. 126/1 R, 211, 214 B; 222/511, 529; 239/197, 390, 407, 447, 569; 99/283, 99/306, 325, 357, 448, DIG. 14; 285/281; 137/78.4, 801; 169/65; 219/689
See application file for complete search history.

(56) References Cited

U.S. PATENT DOCUMENTS

| | | | |
|---|---|---|---|
| 2,620,785 A | 12/1952 | Zimmermann et al. | |
| 6,621,058 B1 * | 9/2003 | Kim | H05B 6/6429 |
| | | | 219/757 |
| 7,817,048 B2 | 10/2010 | Rouse et al. | |
| 8,061,386 B2 | 11/2011 | Mueller et al. | |
| 8,162,236 B2 | 4/2012 | Rodenbeck et al. | |
| 8,516,628 B2 | 8/2013 | Conroy | |
| 9,009,883 B2 | 4/2015 | Chase et al. | |
| 2006/0186215 A1 | 8/2006 | Logan | |

(Continued)

FOREIGN PATENT DOCUMENTS

| | | |
|---|---|---|
| DE | 10244984 A1 | 4/2004 |
| KR | 20160097700 A | 8/2016 |

OTHER PUBLICATIONS

Neumann, EP 1411301 (Year: 2004).*

(Continued)

*Primary Examiner* — VY T Nguyen
(74) *Attorney, Agent, or Firm* — Gray Ice Higdon

(57) ABSTRACT

An over-the-range microwave appliance includes a pot filler water dispenser for dispensing water to a vessel situated on a cook top below the microwave. The microwave includes a pot filler housing adjacent a cooking cavity that creates a recess into which the pot filler is housed that is not visible from the front of the appliance. The pot filler includes a dispensing hose or conduit that is retractable or retractably mounted within the pot filler housing recess. The dispensing hose is biased into a stowed position and can be pulled against the bias to place the dispensing hose into a deployed condition, thereafter returning to its stowed position.

20 Claims, 8 Drawing Sheets

(56) References Cited

U.S. PATENT DOCUMENTS

2020/0089262 A1    3/2020  Wales et al.
2024/0027074 A1*   1/2024  Bartelick .............. F24C 15/003

OTHER PUBLICATIONS

Helm, DE 102018114117 (Year: 2019).*
Chang, CN 203634002 (Year: 2014).*
Aliexpress, Boat Caravan RV Camper 2 Burner LPG Gas Stove Hob and Sink Combo with Folding Hot/Cold Water Faucet 775*365*150/120mm GR-904LS, Retrieved on Mar. 30, 2020, Retrieved from: https://www.aliexpress.com//33059051110.html.

* cited by examiner

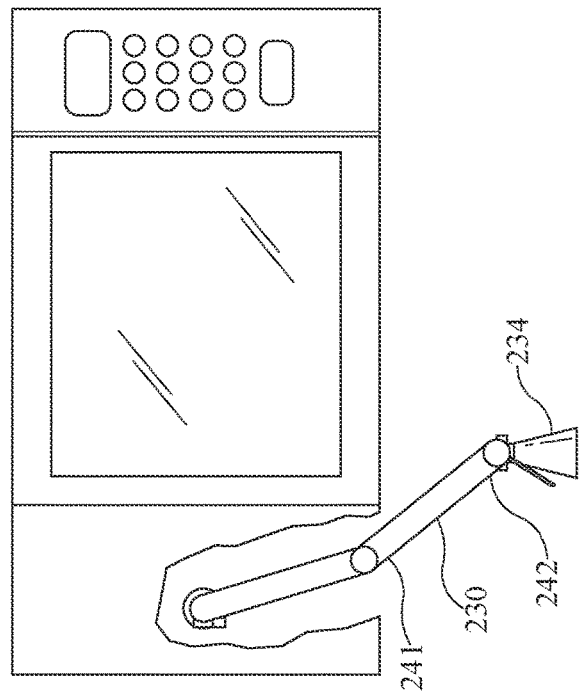
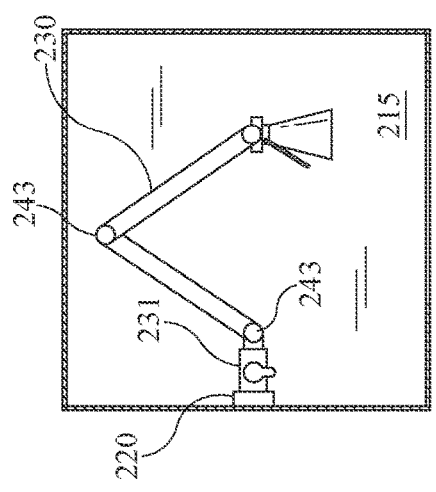
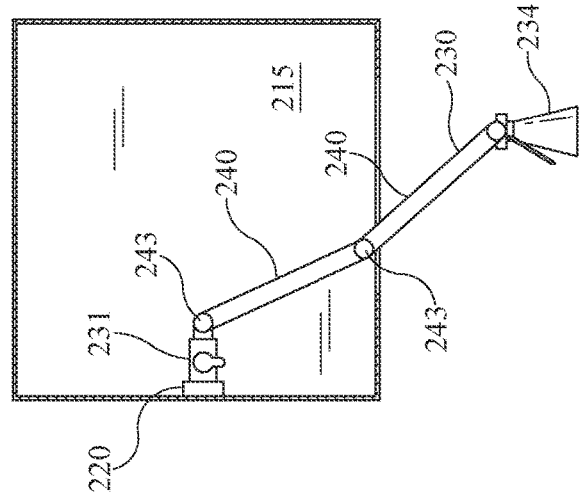

MICROWAVE WITH WATER DISPENSER

CROSS-REFERENCE TO RELATED APPLICATIONS

None

BACKGROUND

It has become desirable in home and commercial kitchens to mount a water supply line on a wall behind a kitchen range appliance. Such water sources are called "pot fillers", and current pot fillers available are typically installed separately from the range or cooktop, either being attached to the wall behind the cooking surface or to the countertop proximate the cooking surface. These pot fillers are fixed and always visible to users and, as a result, must generally be made of attractive materials with attractive finishes, so as not to detract from the look and feel of the kitchen. This need leads to increased costs in order to make them pleasing in appearance. Additionally, these pot fillers are typically mounted very near, if not on, the range surface itself, so they tend to get dirty due to their close proximity to the items being cooked.

Accordingly, a need exists in the art for a pot filler that is hidden from sight, so that the pot filler need not be made in expensive materials and/or finishes. A need further exists for a pot filler to be retractably mounted within a microwave appliance so that it can be deployed by a user and then stowed in a location high above the cooktop surface, so as to remain relatively clean.

SUMMARY

The herein-described embodiments address these and other problems associated with the art by providing a mounting bracket and appliance that is configured for mounting to a wall. The bracket includes a ledge depending outwardly therefrom. The appliance includes a cam rotatably coupled thereto that is received on the ledge.

In a first aspect, an over the counter microwave appliance is described comprising an appliance body including (a) a cooking cavity accessible by a door, (b) a pot filler housing located adjacent the cooking cavity and having a water supply opening therein through the appliance body for connection to a water source, the pot filler housing further including an open space for receiving a pot filler therein, and (c) an exhaust portion located below the cooking cavity; and a pot filler located within the open space of the pot filler housing and coupled to the appliance body, the pot filler further comprising a connection to a water source; a water supply conduit within the pot filler housing and in fluid communication with the water source via the connection; and a delivery nozzle in fluid communication with the water supply conduit for dispensing water from the water source into a vessel located below the appliance body.

In another aspect, an over the counter microwave appliance is described comprising an appliance body having a cooking cavity therein and a vent below the cooking cavity; a housing adjacent the cooking cavity further comprising an open space bounded by four walls and a top, the open space accessible from beneath the four walls, the housing having a first opening at one of the walls; a pot filler coupled within the open space of the housing, the pot filler further comprising a water supply conduit arranged to be coupled in fluid communication with a water source through the first opening, the water supply conduit being extendable to a deployed condition and retractable to a stowed condition, wherein the deployed condition exists when a portion of the water supply conduit is below an imaginary plane defined by the lower extremities of the four walls, and wherein the stowed condition exists when the water supply conduit is above the imaginary plane and fully contained within the open space.

In another aspect, an over the counter microwave appliance is disclosed comprising an appliance body having a front, a rear, a top, and two sides, the front including a front-facing surface that is oriented vertically when the appliance is mounted on a wall above a range, the rear including a wall-facing surface parallel to the front-facing surface, the appliance body also including a cooking cavity therein, the wall-facing surface further including a wall opening therein to receive a water source connection, the cooking cavity having a front-facing access door coplanar with the front-facing surface; a vent below the cooking cavity and the front-facing access door, the vent being in a bottom-facing orientation when the appliance is mounted on a wall above a range; a pot filler housing adjacent the cooking cavity and obscured from view by the front-facing surface, the pot filler housing being bounded by walls, having an opening accessible from a bottom side, and being located behind the front-facing surface; and a pot filler mounted within the pot filler housing behind the front-facing surface and including a water supply conduit coupled to and in fluid communication with the water source via the wall opening.

These and other advantages and features, which characterize the invention, are set forth in the claims annexed hereto. For a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 7 is a left side schematic view of an over the range appliance with the left side of the appliance removed for easier viewing, with the pot filler in the stowed condition, according to another embodiment.

FIG. 8 is a left side schematic view of the appliance of FIG. 7 with the pot filler in a deployed condition, according to an embodiment.

FIG. 9 is a front schematic view with partial cutaway of the appliance of FIG. 8.

DETAILED DESCRIPTION

The embodiments discussed hereinafter are directed in part to an over-the-counter cooking appliance having a retractable pot filler mounted therein, and a method for using same. Microwave ovens are commonly installed over the range ("OTR"). Such microwave appliances typically have an under side that includes vents and/or filters to exhaust air and steam away from the range top. Embodiments herein describe such appliances having mounted therein a pot filler that is generally hidden from normal view, and retractable into and out of deployment.

Figure 1:
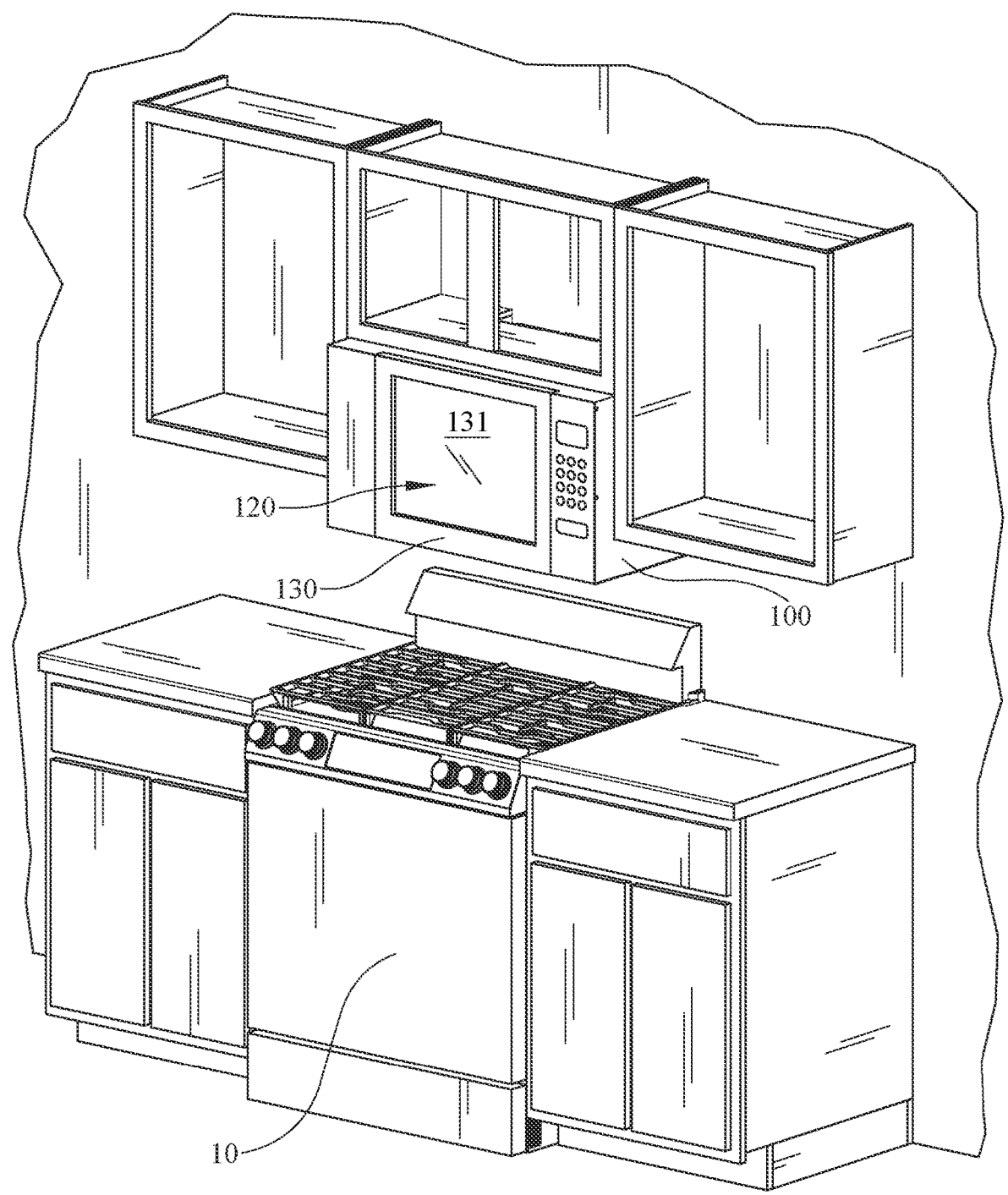
FIG. 1 is a perspective view of an over the range appliance in a typical cabinet environment, according to an embodiment.

Turning now to the drawings, wherein like numbers denote like parts throughout the several views, FIG. 1 illustrates an example over-the-range ("OTR") microwave appliance 100 mounted in a typical OTR location. Such OTR microwaves offer several advantages over a countertop microwave, including that they do not take up valuable counter space and they may provide a neater appearance to the kitchen. Additionally, OTR microwave cooking appliances may have built-in exhaust fans that serve as a stovetop ventilation system to minimize smoke, steam, and cooking odors. These appliances offer several advantages over standard range hoods, which provide exhaust capability, but do not provide cooking capability above the range.

Figure 2:
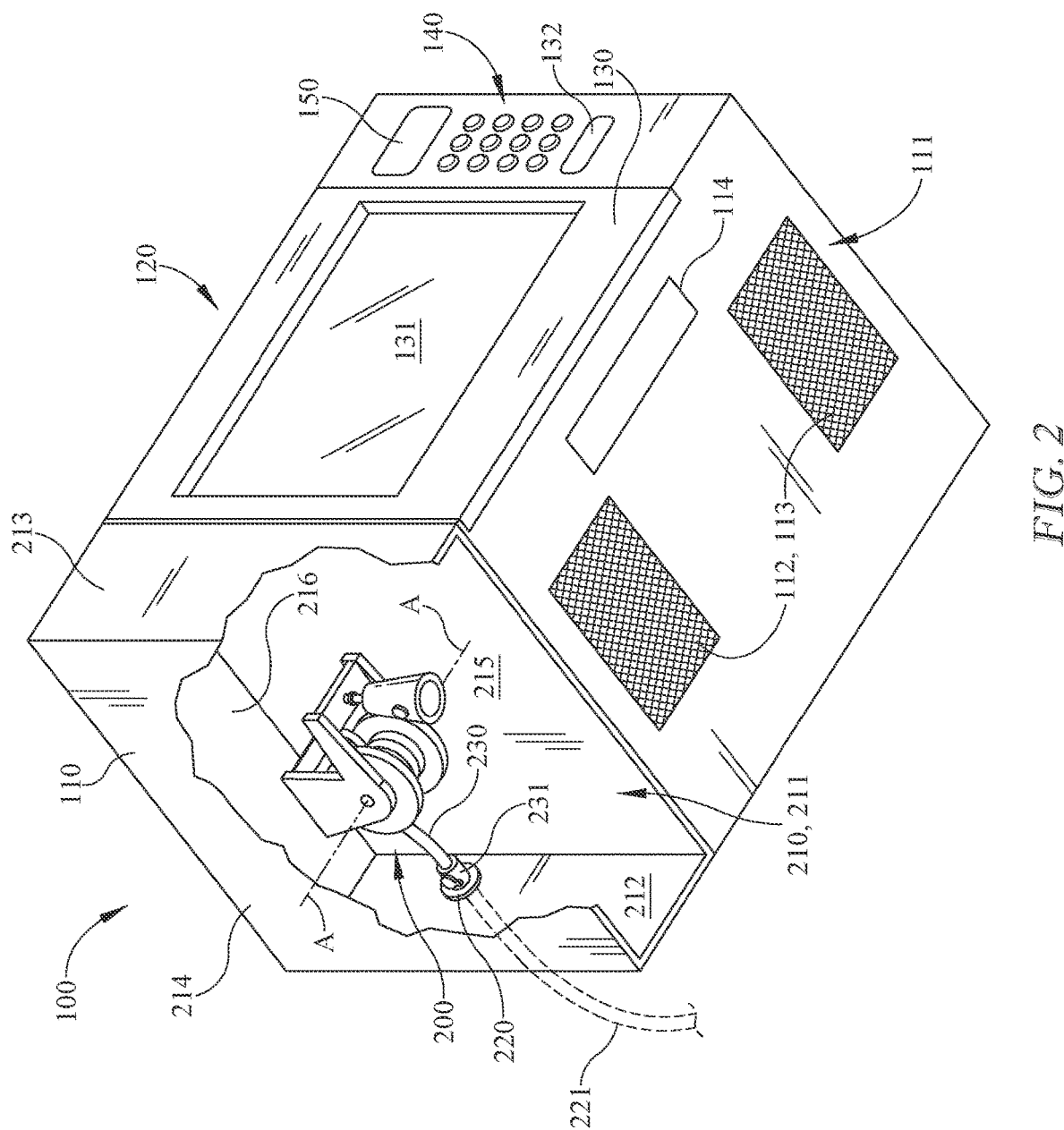
FIG. 2 is a bottom perspective view of the over the range appliance of FIG. 1, according to one embodiment.

With reference to FIG. 2, the appliance 100 shown is a residential-type microwave cooking appliance, and as such includes a housing or enclosure 110, which further includes a cooking cavity 120, as well as a door 130 disposed adjacent the respective opening of the cooking cavity 120. In typical appliance embodiments, the door 130 may further include a window 131 that allows a user to view the items inside the cooking cavity 120. In some embodiments, in place of, or in addition to, the handle (in embodiments including a handle, not illustrated), the appliance 100 may include a button 132 that a user may press to trigger the opening of the door 130. The enclosure 110 may include a front face 115 that is vertically oriented when the appliance is mounted to a wall in a typical installation. The enclosure 110 also would ordinarily include a rear face 116 that is substantially parallel to the front face, and the rear face is typically mounted to the wall above the range 10.

The typical appliance 100 may also include one or more user activated controls 140, which may be in the form of buttons, knobs, a touchscreen, or the like. In some embodiments, these user activated controls 140 may be used to program a cooking time and/or a cooking power level. In addition, in some embodiments, these user activated controls 140 may be used to select one or more preset conditions for a particular food item to be cooked or a particular desired action (e.g. "popcorn", "defrost", "frozen pizza", etc.). In some embodiments, the preset conditions may include one or more adaptive thermal sensing cycles such as an auto-defrost or auto-cook cycle. The appliance 100 may also include a display 150, which may be used to convey a variety of information to a user. For example, in some embodiments, the display 150 may be used to display the time when the appliance 100 is not in use. In other embodiments, the display 150 may be used to display cooking times, power levels, and/or temperatures, and so forth. In some embodiment, the controls 140 are located on the right side of the cooking cavity 120, and in some embodiments the controls 140 are located elsewhere on the appliance 100, including below the cooking cavity 120.

Figure 3:
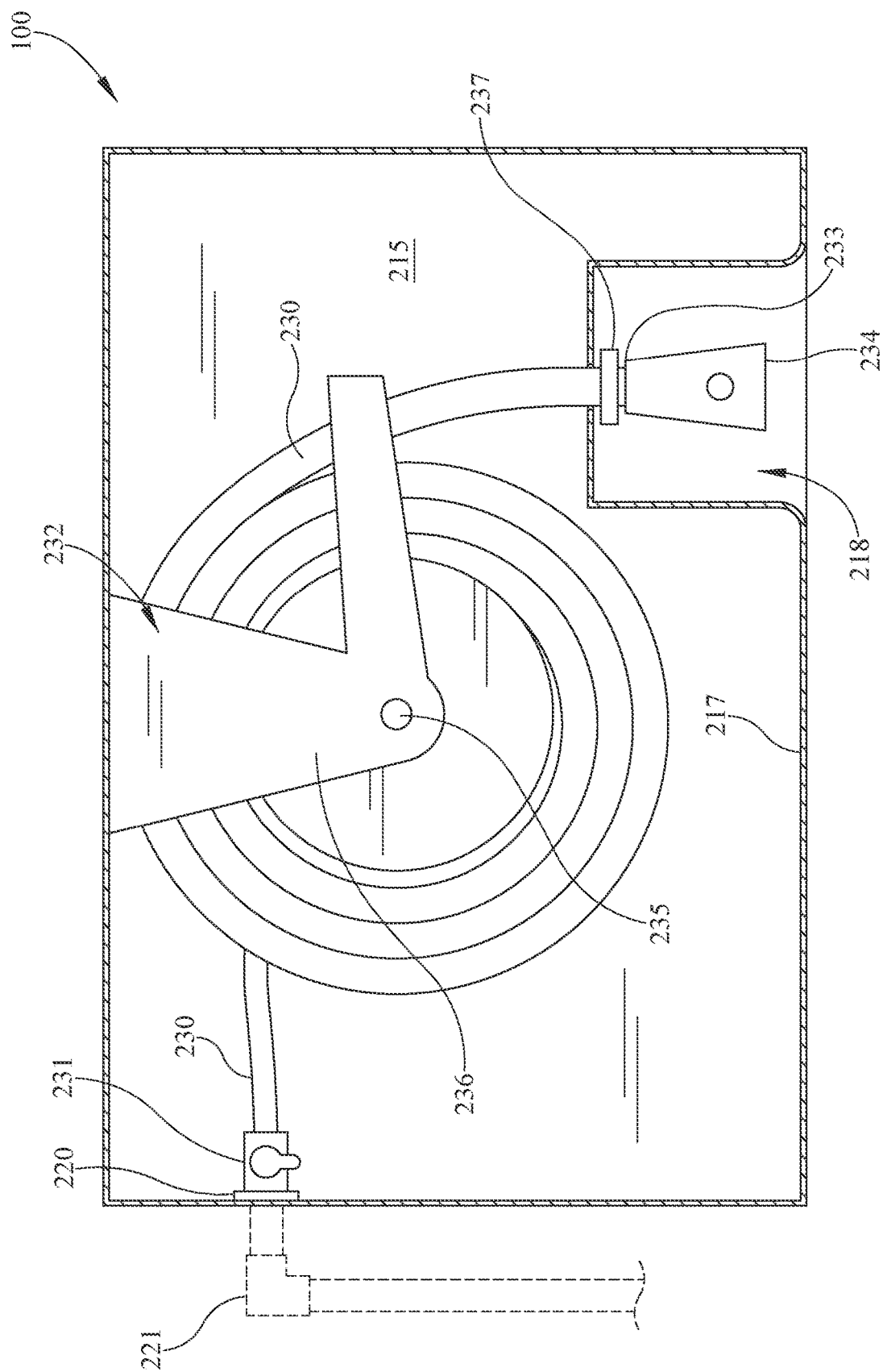
FIG. 3 is a left side schematic view of the appliance of FIG. 2 with the left side of the appliance removed for easier viewing, according to one embodiment.

With reference to FIGS. 1-3, an embodiment of the appliance 100 is shown that includes a pot filler 200. In this embodiment the controls 140 are located on the right side of the cooking cavity 120 and the pot filler 200 is located adjacent the cooking cavity 120 on the left side thereof. Looking at a bottom of the appliance 100 it is seen that the enclosure 110 of the appliance 100 includes two portions: an exhaust portion 111 and a pot filler housing 210. The exhaust portion 111 is typically downwardly facing over the range 10 and is accessible from the bottom and includes typical features of an over the range exhaust hood, including one or more vents 112, each having a filter 113. The exhaust portion 111 further includes a light 114 to illuminate the range 10 below. The pot filler housing 210 provides an open space 211 to receive therewithin a pot filler 200 such that the pot filler 200 can be hidden from view when the appliance 100 is viewed from the front. Therefore, typically the open space 211 of the pot filler housing 210 is formed by a back side 212, a front side 213, a left side 214, a right side 215, and a top side 216. The back side 212 can be, in differing embodiments, part of, an extension of, or one in the same as the rear face 116 of the enclosure 110, and so therefore is typically vertically oriented. Similarly, the front side 213 can be, in differing embodiments, part of, an extension of, or one in the same as the front face 115 of the enclosure 110, and so therefore is typically vertically oriented. The bottom edges of the back side 212 (and therefore also possibly rear face 116), front side 213 (and therefore also possibly front face 115), left side 214, and right side 215 each have a lowest extremity. In embodiments where all these lowest extremities are at the same elevation, they create one or more imaginary planes (horizontal or substantially horizontal) defining the lowest points of the appliance 100. Any structure located above such imaginary plane (such as, for example, the pot filler 210 in its stowed condition) would not be visible from a front view of the appliance 100. Any structure located below such imaginary plane (such as, for example, the pot filler 210 in its deployed condition) would be visible from a front view of the appliance 100.

One side of the pot filler housing 210 (typically either the back side 212, but could also be top side 216 or lefts side 214 or right side 215) includes a water supply opening 220 therethrough to allow connection to a water source 221. The water source 221 is, ordinarily, a supply of water that feeds the user's location. This is typically a pressurized water supply (i.e., from a public water utility), but could also be from a well, a cistern, or some other pressurized, or even gravity-fed water supply source. The water supply opening 220 can be take many shapes, but is typically a through-hole or a slot or some other access shape to allow a user to connect the pot filler 200 to the water source 221. The water supply opening 220 may also include additional convenience features such as grommets, gaskets, seals, sleeves, boots, or other fittings to enable a user to adequately connect the pot filler 200 to the water source 221, as will be described below.

In the embodiment of FIGS. 1-3, the pot filler 200 comprises a water supply conduit 230. A valve 231 is connected at one end to the water source 221 and at the other end to the water supply conduit 230. The valve 231 can be of any valve variety (ball, gate, butterfly, and the like, manual or electronically controlled), but typically would be a standard shut-off valve common in household plumbing situations. The water supply conduit 230 is preferably a hose or tubing adequate to allow pressurized water from the water source 221 to flow therethrough. Although any standard type of material is acceptable for functionality (e.g., hoses or tubing made from high temperature silicone, PVC, polyurethane, polyethylene, reinforced with fabric, yarn, or metal coil or braid, to name just a few), preferably a material is used that is also rated to withstand the heat encountered above a range. Generally speaking, it would be preferable to choose a material that is capable of withstanding any amount of heat and steam that might be generated on a range 10. Materials that are preferable include high temperature silicone, reinforced. The water supply conduit 230 has a terminal end 233 opposite to the end that connects to the valve 231. Preferably, though not required, the terminal end 233 is fitted with a delivery nozzle 234, which can include an actuator to start/stop the flow of water through the nozzle. The delivery nozzle 234 can be of many varieties, depending on user preference. The nozzle might be any of various types of spray nozzle (fan, jet, hollow cone, full cone, and the like) or aerator (standard aerated, spray, laminar, and the like). The delivery nozzle 234, if used, can also include a shut-off mechanism or other flow-modifying feature to allow a user to modify and/or shut off water flow through the terminal end 233. In this manner, the water supply conduit 230 and, if included, delivery nozzle 234, are in fluid communication with the valve 231 and the water source 221.

Water supply conduit 230 is coupled to, that is wrapped around, a retractable reel 232, which is akin to a hose reel. Reel 232 further comprises a shaft 235 and a frame 236. The frame 236 of reel 232 is mounted to the appliance 100 within the pot filler housing 210, preferably on the top side 216 or back side 212. Reel 232 is rotatable in both clockwise and counter-clockwise directions. The water supply conduit 230 on the reel 232 has a stowed condition, in which the water supply conduit 230 and the delivery nozzle 234 are fully retracted and hidden from normal view. The water supply conduit 230 also has a series of deployed conditions, as the water supply conduit 230 is pulled from the stowed condition. By pulling the water supply conduit 230, this turns the shaft 235 of the reel 232 in a first direction (e.g., clockwise), which allows greater lengths of the water supply conduit 230 to be "paid out". This allows a user to place the terminal end 233 (and/or the delivery nozzle 234) of the water supply conduit at or adjacent any desired location beneath appliance 100 to deliver water thereto. Once the pot filler 200 has been used as desired to add water to a vessel at a given location, the user returns the water supply conduit 230 to its stowed condition. Preferably the frame 236 of the reel 232 has a stop mechanism 237 (see FIG. 2) that prevents the reel 232 from over-rotating from the deployed condition to the stowed condition. Basically the stop mechanism 237 is a feature that simply catches, blocks, stops, or otherwise interferes with the delivery nozzle 234 (or terminal end 233), preventing it from re-winding the water supply conduit 230 too far.

Preferably, the reel 232 has a bias toward the stowed condition, such that the reel 232 is retractable. This can be achieved in any number of familiar ways, akin to retractable water hoses or air hoses. A preferred method is to include a torsion spring coupled to the shaft 235, biased toward the stowed condition. As the water supply conduit 230 is pulled, which unwinds the reel 232, this pulling acts against the torsion spring. Once the pulling force is no longer present, the torsion spring rotates the shaft 235 in a direction opposition the pulling force, thus retracting the water supply conduit 230 and winding it upon the reel 232 until the terminal end 233 (or delivery nozzle 234) rests against the stop mechanism 237, where it will remain, out of normal sight of a user, within the pot filler housing 210, ready to be deployed again.

FIGS. 1-2 show a pot filler 200 in which the delivery nozzle 234 rests against stop mechanism 237 that is coupled to the frame 236 of the reel 232. FIG. 3 shows an embodiment in which stop mechanism 237 is actually a feature of the pot filler housing 210. For example, the pot filler housing 210 may further include a bottom 217. Bottom 217 may include a recess 218 therein. In one example, the recess 218 has an opening therethrough that is large enough for the water supply conduit 230 to pass, but another opening is not large enough for the terminal end 233 or delivery nozzle 234 to pass. In this manner, the biased retractable reel 232 will re-wind the water supply conduit 230 until the terminal end 233 or delivery nozzle 234 contacts a surface of the recess 218.

Figure 4:
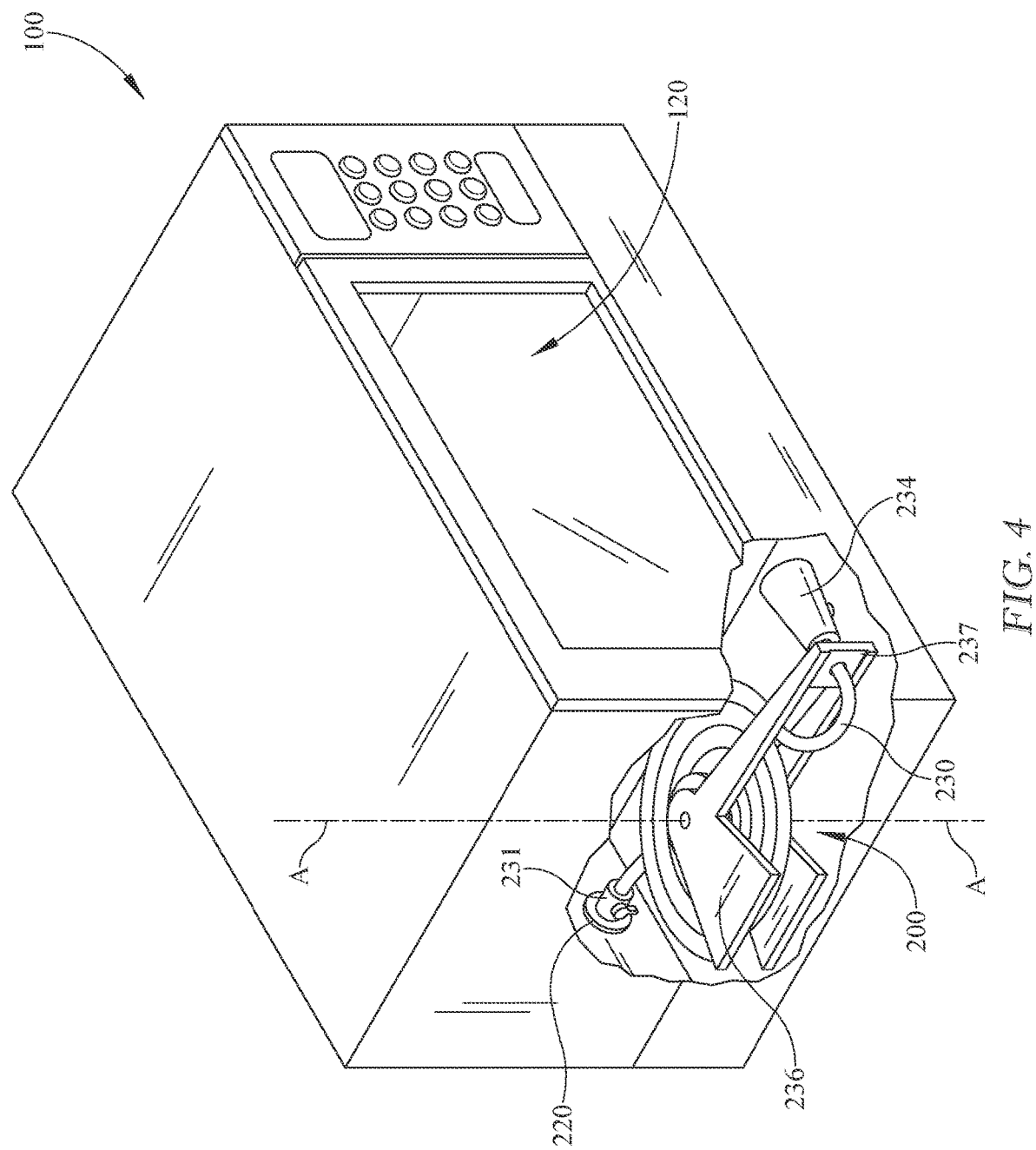
FIG. 4 is a partial cutaway perspective view of an over the range appliance according to another embodiment.
Figure 5:
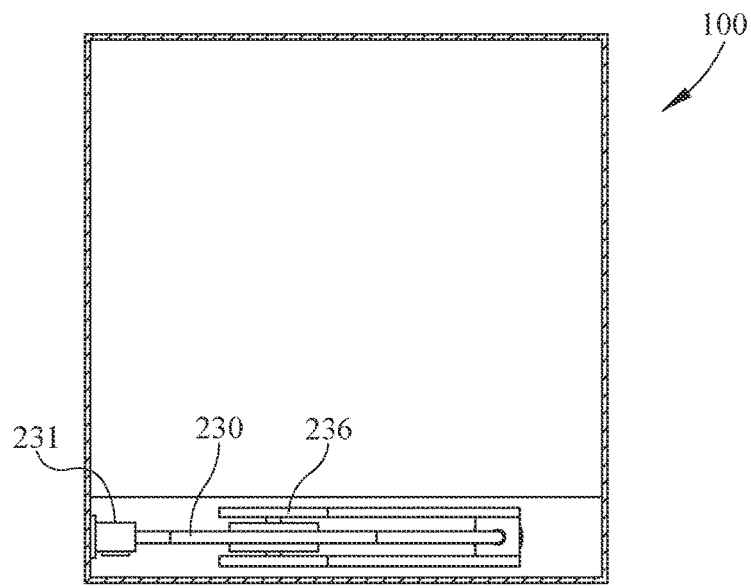
FIG. 5 is a left side schematic view of the appliance of FIG. 4 with the left side of the appliance removed for easier viewing, according to one embodiment.
Figure 6:
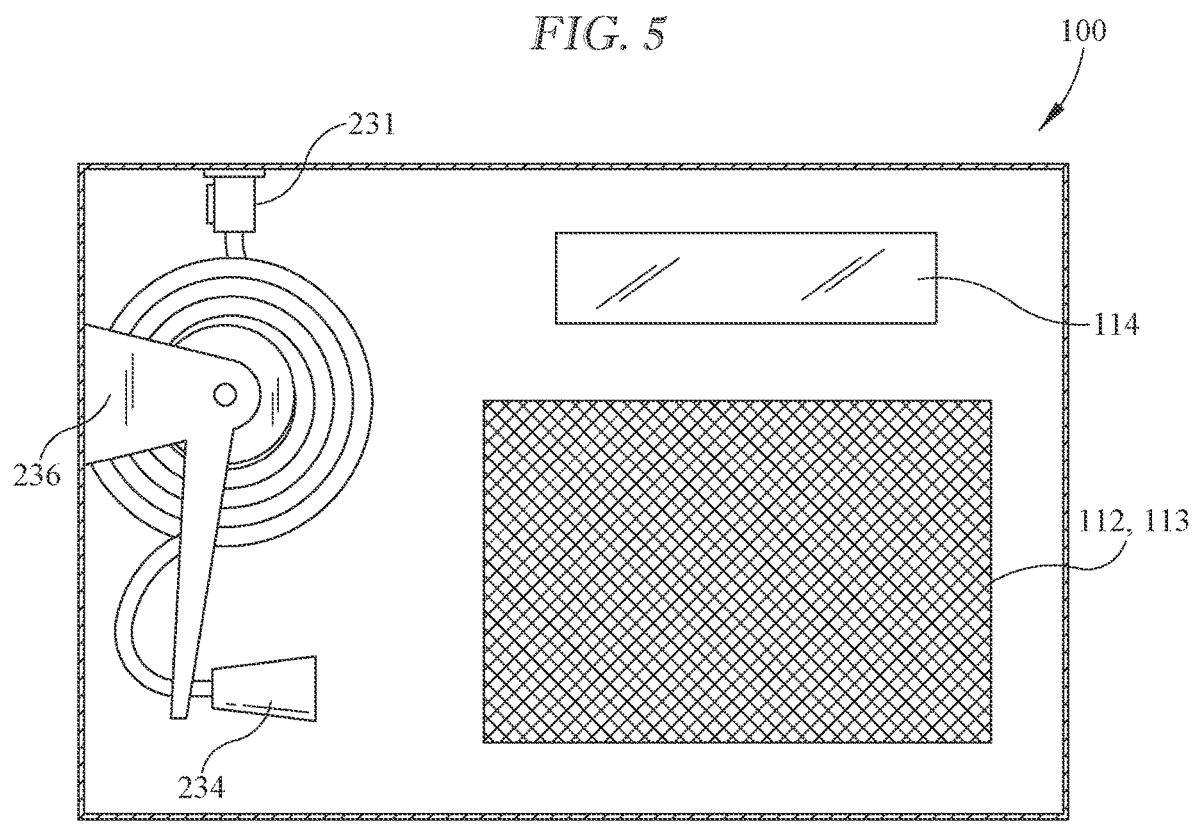
FIG. 6 is a bottom schematic view of the appliance of FIG. 4, according to an embodiment.

Referring now to FIGS. 4-6, an alternate embodiment of the appliance 100 is depicted. In this embodiment, the pot filler 200 is similarly adjacent the cooking cavity 120 as the embodiment of FIGS. 1-3, but is located below the cooking cavity 120 (as opposed to being beside it). Much of this embodiment is similar to the embodiment shown in FIGS. 1-3, including the inclusion of water supply conduit 230, valve 231, retractable reel 232, delivery nozzle 234, shaft 235, frame 236, and stop mechanism 237. In this embodiment, however, the reel 232 is situated in a pot filler housing 210 that is below the cooking cavity 120. In circumstances where the overall height of this pot filler housing 210 is relatively small within the appliance 100, the reel 232 can be mounted in an orientation such that the rotation of the shaft 235 is about a vertical axis "A", as opposed to the horizontal shaft axis "A" depicted in FIGS. 1-3.

Referring now to FIGS. 7-9, an alternative embodiment of the pot filler 200 is shown. In this depicted embodiment, the pot filler 200 is disposed within a pot filler housing 210 similar to that shown in FIGS. 1-3 or FIGS. 4-6, and includes many of the same features as the embodiment shown in FIGS. 1-3, including the inclusion of water supply conduit 230, valve 231, and delivery nozzle 234. In this embodiment, the pot filler 200 does not comprise a retractable reel 232. Further, instead of water supply conduit 230 being a hose or tube, in this embodiment the water supply conduit 230 comprises a series of jointed pipes 240. This type of pipe can be any of a number of materials (e.g., PVC, copper, steel, cross-linked polyethylene (PEX) and the like that are suitable for drinking water and, for example, used in pot fillers mounted on the wall or on the counter. Each section of jointed pipes 240 includes a first end 241 and a second end 242. Each joint 243 allows pivotal movement about at least one axis of rotation. The combination of joints used can be designed so as to permit the nozzle to be positioned over any cooking utensil on the range 10. In this way, the entire length of pipe can be moved from a stowed condition (FIG. 7) to a deployed condition (FIGS. 8-9). The internal resistance in the joints 243 allows the pipes to be moved to different configurations (like a deployed condition), temporarily maintain a given configuration, and then be moved to other configurations (like a stowed condition). This embodiment of pot filler 200 can be housed in the pot filler housing 210 of either FIGS. 1-3 or of FIGS. 4-6.

Figure 10:
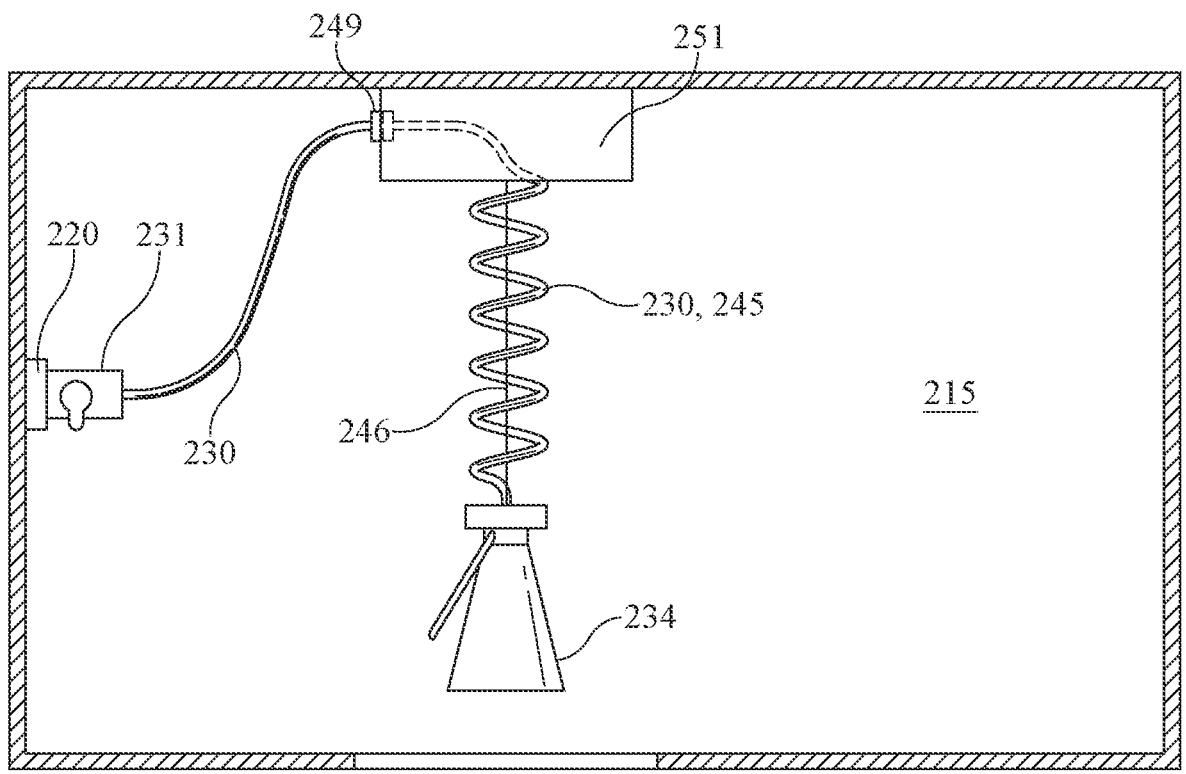
FIG. 10 is a left side schematic view of an over the range appliance with the left side of the appliance removed for easier viewing, according to another embodiment.

Referring now to FIG. 10, an alternative embodiment of a pot filler 200 is shown. In this depicted embodiment, the pot filler 200 is disposed within a pot filler housing 210 similar to that shown in FIGS. 1-3, and includes many of the same features as the embodiment shown in FIGS. 1-3, including the inclusion of water supply conduit 230, valve 231, and delivery nozzle 234. In this embodiment the pot filler 200 does not comprise a reel 232. Rather, the water supply conduit 230 is a made of a coiled spring hose 245. When needed, the user can pull on the water supply conduit 230, 245 and move it to a desired location; dispense water therethrough; and then allow the coiled hose to retract to the stowed condition via, for example, assistance from spring balancer 251. In the embodiment shown, the water supply conduit 230 involves two sections: (1) a first section that is not a coiled hose, wherein this section has one end connected to the valve 231 and a second end coupled to a suitable water fitting 249 at the spring balancer 251; and (2) a second section that is the coiled hose 245, wherein this section has one end connected to the water fitting 249 at the spring balancer 251 and a second end connected to the delivery nozzle 234. In the figures, the spring balancer 251 is drawn schematically. The spring balancer 251 typically would include a torsion spring or some other biasing mechanism therein, and a tether 246 that attaches to the delivery nozzle 234. The spring balancer 251 and tether 246 eliminate the need for the coiled hose 245 to have to bear the load (weight) of the hose and delivery nozzle 234. The spring balancer 251 shown in FIG. 10 includes retractable tether 246, and the coiled hose 245 of water supply conduit 230 extends/retracts with the tether 246.

Figure 11:
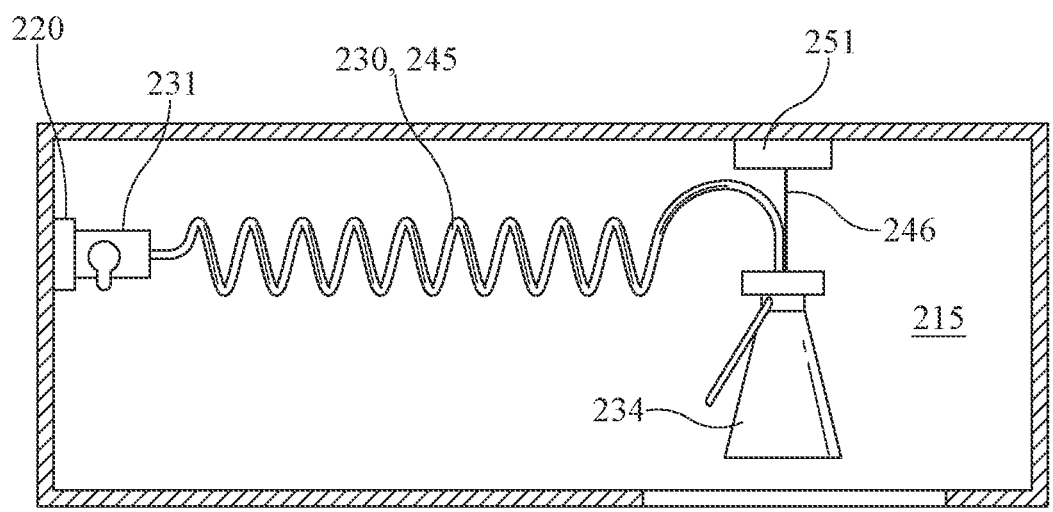
FIG. 11 is a left side schematic view of an alternative embodiment of the appliance of FIG. 10 with the left side of the appliance removed for easier viewing.

FIG. 11 shows a modified embodiment of the pot filler 200 of FIG. 10 disposed in, for example, a pot filler housing 210 similar to that shown in FIG. 4-6, wherein spring balancer 251 is also used and includes tether 246. In this embodiment, the water supply conduit 230 is simply the primary coiled hose 245 (that is, it does not have two separate sections, and does not require a water fitting 249 at the spring balancer 251). The spring balancer 251 retracts the water supply conduit 230 to its stowed position via the spring-biased tether 246.

Figure 12:
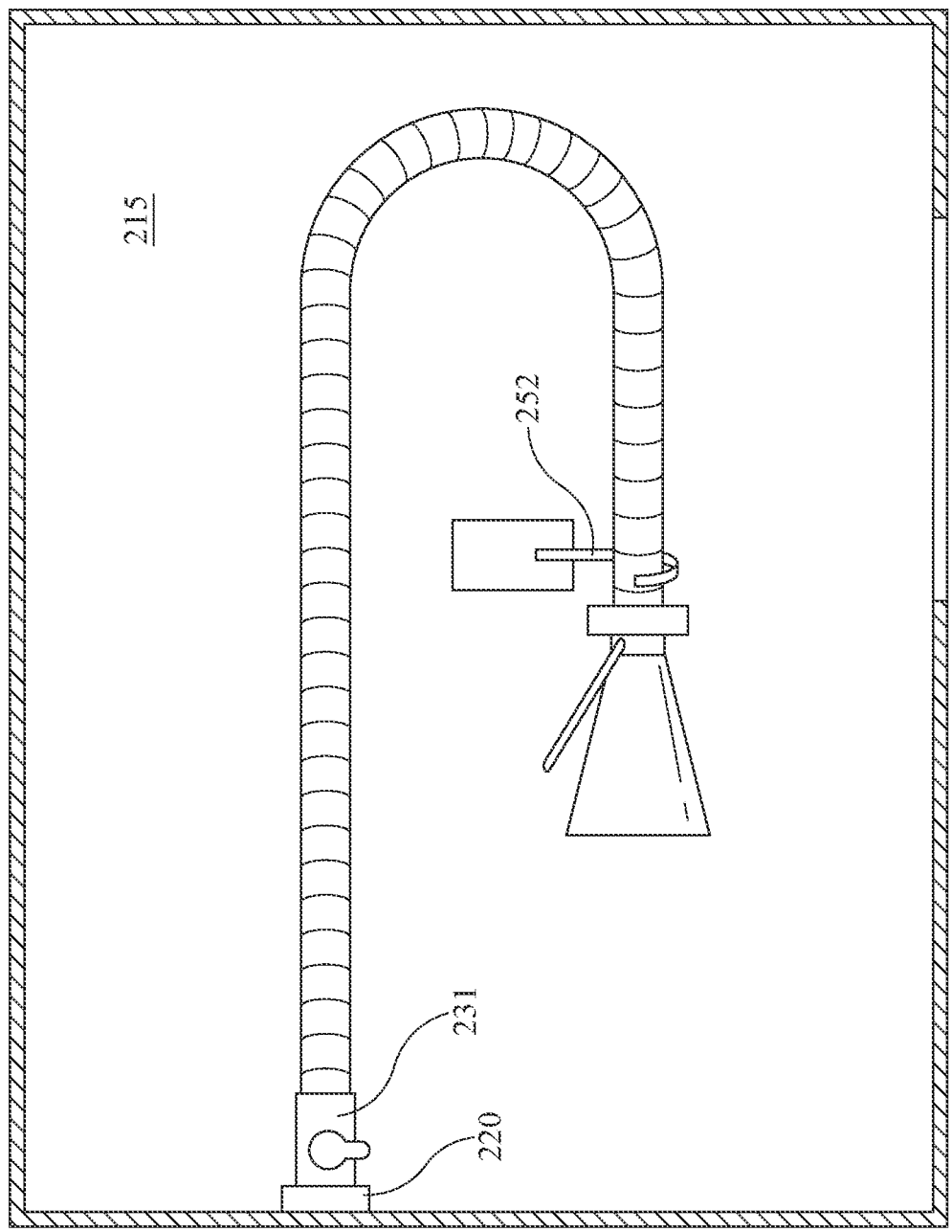
FIG. 12 is a left side schematic view of an over the range appliance with the left side of the appliance removed for easier viewing, according to another embodiment.

Referring now to FIG. 12, an alternative embodiment of a pot filler 200 is shown. In this depicted embodiment, the pot filler 200 is disposed within a pot filler housing 210 similar to that shown in FIGS. 1-3 or FIGS. 4-6, and includes many of the same features as the embodiment shown in FIGS. 1-3, including the inclusion of water supply conduit 230, valve 231, and delivery nozzle 234. In this embodiment the pot filler 200 does not comprise a reel 232. Rather, the water supply conduit 230 is a made of a metal flexible hose. The metal flexible hose is flexible and can be bent and moved into various orientations and can maintain a given position/orientation, but is flexible enough to be moved to any desired location. When needed, the user can pull on the water supply conduit 230 and move it to a desired location; dispense water therethrough; and then manually bend or move the water supply conduit 230 back to its stowed condition. Alternatively, a holster 252 (e.g., a loop, hook, saddle, etc.) can be mounted inside the pot filler housing 210 onto which or into which the delivery nozzle 234 (or terminal end 233) can be coupled so as to be retained in a desired stowed location.

Embodiments described herein can further include additional features that facilitate use and/or add more convenience to the appliance. For example, any of the embodiments of the pot filler 200 can further include apparatus and systems to provide measured fill capabilities and/or to prevent or minimize spills or overflows into any given container. Such system could additionally include a water valve 231 that is controllable, an output water flow meter, a configurable water flow actuator on the delivery nozzle 234, and a user interface operable to set the desired water dispensing parameters. The user interface might be included on the delivery nozzle 234 actuator, or might be included on the appliance 100 itself. Exemplary parameters that might be selectable by a user via the interface might be, for example, the type of dispensing desired (such as by weight or by volume), the type of units, and/or the amount to dispense. Once the desired parameters have been chosen, the user can activate the actuator (e.g., depressing a button or trigger on the delivery nozzle 234 or on the appliance 100, or, if enabled to be used by a smart phone application, by a button on the app). The flow of water would then begin and continue until the desired parameters have been achieved, or until the user interrupts the flow. Obviously a readout could also be incorporated that indicates, visually or audibly, or both, to the user the relevant status and condition of the water flow through the water supply conduit 230. Other automated features for similar purposes might include a vision system with appropriate cameras and/or sensors to detect the water level in the container being filled by the user and to provide a signal to the delivery nozzle 234 actuator to issue a stop command if certain fill parameters (such as full, over-filled, and/or spill) are detected by the cameras or sensors.

Additional automated features can also be added to the embodiments described herein that facilitate the movement, orientation, and location of the water supply conduit 230 and/or the delivery nozzle 234. For example, electro-mechanical systems for moving, placing, extending, and retracting the water supply conduit 230 are also contemplated. For examples, additional springs, pulleys, retractors, and the like can be added to facilitate the desired movement of the delivery nozzle 234. Also, programmable features can be included, such as user-controlled servos, linear actuators, and the like, that allow the user to move the delivery nozzle 234 and/or the water supply conduit 230 to desired locations by inputting an electrical or an electro-mechanical input (e.g., making a selection on a user interface, pressing a button on the appliance 100, pressing a button on a software application, and the like) that translates that user input selection into a mechanical motion (e.g., winding/unwinding the reel 232; extending/retracting the water supply conduit 230; moving the jointed pipes; and so forth).

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed.

Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. An over the counter microwave appliance comprising: an appliance body including (a) a cooking cavity accessible by a door, (b) a pot filler housing located adjacent said cooking cavity and having a water supply opening therein through said appliance body for connection to a water source, said pot filler housing further including an open space for receiving a pot filler therein, and (c) an exhaust portion located below said cooking cavity and not in fluid communication with said open space receiving said pot filler; and
said pot filler located within said open space of said pot filler housing and coupled to said appliance body, said pot filler further comprising a connection to the water source; a water supply conduit within said pot filler housing and in fluid communication with said water source via said connection; and a delivery nozzle in fluid communication with said water supply conduit for dispensing water from said water source into a vessel located below said appliance body.

2. The appliance of claim 1, wherein said supply conduit is moveable from a stowed position within said pot filler housing to a deployed position outside said pot filler housing.

3. The appliance of claim 2, wherein said supply conduit is retractable from said deployed position to said stowed position.

4. The appliance of claim 3, wherein said supply conduit is retractable by way of a hose reel around which said supply conduit is wrapped.

5. The appliance of claim 4, wherein said water supply conduit further includes a stop mechanism affixed thereto to prevent over retraction of said water supply conduit.

6. The appliance of claim 3, wherein said supply conduit is made from spring coiled tubing.

7. The appliance of claim 6, wherein said spring coiled tubing is coil-biased toward a stowed position.

8. The appliance of claim 6, wherein said spring coiled tubing further includes a spring balancer to aid retraction of said spring coiled tubing to said stowed position.

9. The appliance of claim 3, wherein said supply conduit is made from metal flexible hose.

10. The appliance of claim 3, wherein said supply conduit is made from multi-jointed pipes.

11. The appliance of claim 10, wherein at least one joint enables said water supply conduit to rotate about a horizontal axis downward away from said appliance body.

12. The appliance of claim 11, wherein at least one joint enables said water supply conduit to rotate about a vertical axis so that the delivery nozzle can traverse laterally above a range cook surface.

13. The appliance of claim 1, wherein said pot filler is visually obstructed in a front viewing direction by a front face of said appliance.

14. The appliance of claim 1, wherein said pot filler further includes a flow meter in fluid communication with said delivery nozzle.

15. The appliance of claim 1, wherein said pot filler further includes a vision system to detect a water level height of the vessel located below said appliance.

16. The appliance of claim 1, wherein said pot filler housing is located below said cooking cavity.

17. An over the counter microwave appliance comprising:
an appliance body having a cooking cavity therein and a vent below said cooking cavity;
a housing adjacent said cooking cavity further comprising an open space bounded by four walls and a top, said open space accessible from beneath said four walls, said housing having a first opening at one of said walls, wherein said open space is not in fluid communication with said vent;
a pot filler coupled within said open space of said housing, said pot filler further comprising a water supply conduit arranged to be coupled in fluid communication with a water source through said first opening, said water supply conduit being extendable to a deployed condition and retractable to a stowed condition, wherein said deployed condition exists when a portion of said water supply conduit is below an imaginary plane defined by the lower extremities of said four walls, and wherein said stowed condition exists when said water supply conduit is above said imaginary plane and fully contained within said open space.

18. The appliance of claim 17, wherein said water supply conduit is retractable via a torsion-spring-biased hose reel.

19. An over the counter microwave appliance comprising:
an appliance body having a front, a rear, a top, and two sides, said front including a front-facing surface that is oriented vertically when said appliance is mounted on a wall above a range, said rear including a wall-facing surface parallel to said front-facing surface, said appliance body also including a cooking cavity therein, said wall-facing surface further including a wall opening therein to receive a water source connection, said cooking cavity having a front-facing access door coplanar with said front-facing surface;
a vent below said cooking cavity and said front-facing access door, said vent being in a bottom-facing orientation when said appliance is mounted on the wall above the range;
a pot filler housing adjacent said cooking cavity and obscured from view by said front-facing surface, said pot filler housing being bounded by walls, having an opening accessible from a bottom side, being not in fluid communication with the vent, and being located behind said front-facing surface; and
a pot filler mounted within said pot filler housing behind said front-facing surface and including a water supply conduit coupled to and in fluid communication with a water source via said wall opening.

20. The appliance of claim 19, wherein said pot filler further comprises a retractable water supply conduit.

* * * * *